United States Patent [19]

Broberg et al.

[11] Patent Number: 5,232,468
[45] Date of Patent: * Aug. 3, 1993

[54] ABRASIVE PRODUCTS BONDED WITH COLOR STABILIZED BASE CATALYZED PHENOLIC RESIN

[75] Inventors: David E. Broberg; Carl A. Jackson, both of St. Paul, Minn.

[73] Assignee: Minnesota Mining and Manufacturing Company, St. Paul, Minn.

[*] Notice: The portion of the term of this patent subsequent to May 5, 2009 has been disclaimed.

[21] Appl. No.: 877,875

[22] Filed: May 4, 1992

Related U.S. Application Data

[63] Continuation of Ser. No. 480,018, Feb. 13, 1990, Pat. No. 5,110,320.

[51] Int. Cl.$^5$ .............................................. B24D 11/00
[52] U.S. Cl. ........................................ 51/295; 51/298; 51/309
[58] Field of Search .......................... 51/295, 298, 309

[56] References Cited

U.S. PATENT DOCUMENTS

| | | | |
|---|---|---|---|
| 2,243,049 | 5/1941 | Kistler et al. | 51/295 |
| 2,308,983 | 1/1943 | Kistler | 51/295 |
| 2,949,351 | 8/1960 | Vigliatura, Jr. | 51/298 |
| 2,952,529 | 9/1960 | Stone | 51/298 |
| 3,163,968 | 1/1965 | Nafus | 51/394 |
| 3,942,959 | 3/1976 | Markoo et al. | 51/295 |
| 4,226,602 | 10/1980 | Fukuda | 51/296 |
| 4,239,503 | 12/1980 | Harris et al. | 51/298 |
| 4,263,016 | 4/1981 | Hirschberg et al. | 51/309 |
| 4,298,356 | 11/1981 | Teschner et al. | 51/297 |
| 4,370,148 | 1/1983 | Hirschberg et al. | 51/293 |
| 4,381,188 | 4/1983 | Waizer et al. | 51/298 |
| 4,500,325 | 2/1985 | Huber et al. | 51/298 |
| 4,588,419 | 5/1986 | Caul et al. | 51/295 |
| 4,802,896 | 2/1989 | Law et al. | 51/298 |
| 4,836,832 | 6/1989 | Tumey et al. | 51/293 |
| 4,877,420 | 10/1989 | Buxbaum et al. | 51/309 |
| 4,903,440 | 2/1990 | Larson et al. | 51/298 |
| 5,110,320 | 5/1992 | Broberg et al. | 51/295 |
| 5,110,321 | 5/1992 | Broberg et al. | 51/295 |

FOREIGN PATENT DOCUMENTS

| | | |
|---|---|---|
| 0058262 | 8/1982 | European Pat. Off. |
| 49-113895 | 10/1974 | Japan |
| 56-027392 | 3/1981 | Japan |
| 526521 | 8/1976 | U.S.S.R. |
| 1263513 | 10/1986 | U.S.S.R. |
| 2018811 | 10/1979 | United Kingdom |

OTHER PUBLICATIONS

C. Noller, "Chemistry of Organic Compounds," (1965), W. B. Saunders Company, Philadelphia and London, p. 553.

D. B. V. Parker, "The Effect of Catalysts on the Thermal Stability of Phenolic Resins," (Mar. 1957), Royal Aircraft Establishment Technical Note No. Chem. 1299.

A. Knop et al., "Chemistry and Application of Phenolic Resins," (1979), Springer-Verlag, p. 185.

*Primary Examiner*—Karl Group
*Attorney, Agent, or Firm*—Gary L. Griswold; Walter N. Kirn; Gregory D. Allen

[57] ABSTRACT

This invention provides coated and three-dimensional, low density abrasive articles which comprise color stabilized alkali metal hydroxide catalyzed phenolic resin.

18 Claims, No Drawings

ABRASIVE PRODUCTS BONDED WITH COLOR STABILIZED BASE CATALYZED PHENOLIC RESIN

This is a continuation of application Ser. No. 07/480,018 filed Feb. 13, 1990, now U.S. Pat. No. 5,110,320.

FIELD OF THE INVENTION

This invention relates to coated and three-dimensional abrasive products made with color stabilized base catalyzed phenolic resin.

BACKGROUND ART

"Phenolic resin" is a term that describes a wide variety of resin products which result from the reaction product of phenols with aldehydes. Phenols react with formaldehydes under both acidic and basic conditions. If a base catalyzed mixture of phenol and formaldehyde contains one or more moles of formaldehyde per mole of phenol, it will produce a thermosetting (one-step) resin. Such resins which are termed "resoles" are commonly used commercially. Common base compounds which are employed as a catalyst for resole resins include the hydroxides of alkali metals such as sodium, potassium, or lithium. While alkali metal hydroxide catalyzed phenolic resins have been in use for a considerable period of time, they have one significant disadvantage. Such resins darken as they age, are heated or are otherwise cured. (See e.g., *Chemistry and Application of Phenolic Resins*, A. Knop and W. Scheib, Springer-Verlg, 1979, p. 185). The darkening is believed to be dependent on the presence of negative ions from the metal hydroxide catalyst causing loss of hydrogen in ionic form from the phenolic hydroxyl groups, a condition which favors oxidation, resulting in the formation of the intensely red phenoquinone. (See, e.g., *Chemistry of Organic Compounds*, C. Noller, W. B. Saunders Co., Philadelphia and London, 1965, p. 553 and "The Effect of Catalysts on the Thermal Stability of Phenolic Resins", D. B. V. Parker, Royal Aircraft Establishment Technical Note No. CHEM. 1229, March, 1957, p. 6) The extent of darkening is known to be dependent on the curing or use temperature of the resin and the time of exposure to such temperature.

Alkali metal hydroxide catalyzed phenolic resins are commonly used as a component of the bond system of abrasive products, such as coated, bonded, and three-dimensional, low density abrasive products. The resin darkening problem is particularly pronounced in coated abrasive and three-dimensional, low density abrasive products because of the more visible presence of the bond system. Furthermore, abrasive bond systems may comprise colorants to identify the manufacturer, type of product, application, etc. The darkening of the resin can interfere with the desired coloration, resulting in an unwanted variation in the product color. Since the darkening increases with the temperature and exposure time, the product color may be variable, and thus unacceptable for aesthetic or other reasons.

Page 7 of Parker discloses cured resoles, also designated as "resols", catalyzed by ammonia, magnesia, or small quantities of sodium hydroxide are yellow-brown or orange rather than the purple or nearly black color produced when larger quantities of sodium hydroxide are used. The focus of Parker's work, however, was on the effect of catalysts on the thermal stability of phenolic resins.

Resol comprising ammonium-based salts have been used in articles unrelated to abrasive products. For example, U.S.S.R. Pat. No. 526521, published Aug. 30, 1976, discloses a pressed article having a light tone, wherein the article contains wood filler, resol, fire proofing agents comprising diammonium hydrogen phosphate and ammonium sulfate, a hardener, and a lubricant.

Japanese Pat. No. 49113895, published Oct. 30, 1974, teaches a transparent cured resol, prepared by refluxing sodium hydroxide catalyzed phenolic resin and ammonium chloride and then removing any particulate by filtration. The abstract of this Japanese patent does not disclose a use for the transparent resin, nor does it suggest a color stabilized resol.

Japanese Pat. No. 56027392, published Mar. 17, 1981, describes the use of acid ammonium salts as additives to a resol to provide improved storage stability for color-developer sheets.

The use of ammonium-based salts as grinding aids in grinding wheel type abrasive articles is known in the art. For example, U.S. Pat. No. 2,308,983 discloses abrasive articles, such as grinding wheels, containing a fluoroborate, such as ammonium fluoroborate or an alkali metal fluoroborate (e.g. potassium fluoroborate or sodium fluoroborate) with improved performance characteristics.

U.S. Pat. No. 2,952,529 teaches sulfur-free resinoid bonded abrasive wheels comprising ammonium chloride and cryolite which offer stainless steel cut performance approximately equal to wheels containing sulfur or sulfide fillers. A sulfur-free resinoid bonded abrasive wheel containing cryolite, ammonium chloride, and chilled iron grit to provide improved heat resistance is disclosed in U.S. Pat. No. 2,949,351.

A grinding wheel comprising ammonium chloroferrate or ammonium chlorofluoroferrite as a grinding aid is disclosed in U.S. Pat. Nos. 4,263,016, and 4,370,148, respectively.

U.S. Pat. No. 4,500,325 discloses an abrasive article in the form of an abrasive disk comprising $A_x Me_y^{II} Me_z^{III} Hal_E . nB_f C_g Hal_e . mH_2O . oNH_3$, wherein A is an alkali metal ion or ammonium ion; x is a number between 0 and 10; $Me^{II}$ is a bivalent metal ion, i.e. Mn, Ca, Mg, Zn, Sn, Cu, Co, or Ni; y is a number between 0 and 2; $Me^{III}$ is a trivalent metal ion, i.e. Al, B, Ti, z is a number between 0 and 2; Hal represents a halogen; E is a number between 1 and 10; n is a number between 0 and 10; B is an alkali metal ion or ammonium; f is a number between 0 and 1; C represents bivalent element (e.g. Ca, Mg, Zn, Sn, or Mn); g is a number between 0 and 1; e is a number between 1 and 2; m is a number between 0 and 10; and o is a number between 0 and 10.

U.S. Pat. No. 4,877,420 teaches abrasive bodies such as grinding wheels or cutting wheels having halogen-containing compounds as a filler and including ammonium-halogen-based compounds.

Grinding wheels comprising anhydrides of strong inorganic acids or acid salts of strong inorganic acids with ammonium are described in U.S. Pat. No. 2,243,049.

U.S. Pat. No. 4,381,188 discloses an abrasive disk comprising abrasive grains, a bonding agent and pellets, wherein the pellets further comprise a binding agent (including phenolic resin), a pulverulent filler, and ammonium chloride.

Coated abrasive and three-dimensional, low density coated abrasive articles differ significantly from bonded abrasive articles such as grinding wheels or cutting wheels. For example, grinding wheels are typically formed as a relatively deep or thick (three-dimensional) structure of abrasive granules adhesively retained together in a wheel. In contrast, a coated abrasive article typically comprises a support member, abrasive granules, and one or more layers of a bond system which serve to bond the abrasive granules to the support member. A coated abrasive article may further comprise additional non-bonding layers such as, for example, a supersize. Furthermore, a coated abrasive article generally has a significantly higher ratio of bond system to abrasive granules than a grinding wheel.

A three-dimensional, low density abrasive article comprises a three-dimensional, low density web structure, abrasive granules, and a bond system which serves to bond the abrasive articles to the web structure. Like a coated abrasive, a three-dimensional, low density abrasive article generally has a significantly higher ratio of bond system to abrasive granules than a grinding wheel. Furthermore, a three-dimensional, low density abrasive article typically has a void volume within the range from about 85% to 95% whereas the void volume of a grinding wheel is usually substantially less than 85%.

Assignee acknowledges that coated abrasive product comprising alkali metal hydroxide catalyzed phenolic resin and ammonium fluoroborate was sold in the 1970's. The ammonium fluoroborate was an occasional contaminate in a potassium fluoroborate grinding aid which was present in the size or supersize layer of some coated abrasive products. Although alkali metal hydroxide catalyzed phenolic resin comprising the ammonium fluoroborate-contaminated potassium fluoroborate was observed to affect the color of the resin, the effect was viewed as undesirable. The ability to color stabilize a cured resole with ammonium fluoroborate or any other ammonium-based salt was not recognized.

The art does not disclose or teach a means of providing coated or three-dimensional, low density abrasive articles comprising color stabilized alkali metal hydroxide catalyzed phenolic resin.

SUMMARY OF THE INVENTION

The present invention provides color stabilized alkali metal hydroxide catalyzed phenolic resin. In another aspect, the invention provides novel abrasive articles having a bond system comprising the color stabilized alkali metal hydroxide catalyzed phenolic resin. The term "color stabilized" as herein used refers to the ability of the phenolic resin to substantially refrain from darkening notwithstanding normal heating or aging. The term "alkali metal hydroxide" refers to the hydroxides of alkali metals such as sodium, potassium and lithium. The term "phenolic resin" refers to any resinous reaction product of a phenol, such as phenol, resorcinol, alkyl-substituted phenol such as cresol, xylenol, p-tert-butylphenol, and p-phenylphenol and the like, with an aldehyde, such as formaldehyde, acetaldehyde and furfuraldehyde, and the like. "Color stabilized alkali metal hydroxide catalyzed phenolic resin" refers to a cured alkali metal phenolic resin which is color stabilized.

Briefly, the color stabilized alkali metal hydroxide catalyzed phenolic resin of the invention is accomplished by the presence of an ammonium-based salt in the resin. The term "ammonium-based salt" refers to any of a variety of ammonium compounds which when added to the alkali metal hydroxide catalyzed phenolic resin have the effect of stabilizing the color of such resins when cured up to 150° C. Preferably, the ammonium-based salt is ammonium chloride, ammonium bifluoride, dibasic ammonium citrate, tribasic ammonium citrate, ammonium aluminum tetrafluoride, ammonium dihydrogen phosphate, diammonium hydrogen phosphate, or an ammonium aluminum fluoride salt represented by the general formula $(NH_4,M,M')AlF_6$, wherein M and M' are cations which may be the same or different and are selected from the group consisting of $NH_4^+$, $Li^+$, $Na^+$, and $K^+$.

According to the present invention an ammonium-based salt is present in an amount sufficient to prevent an alkali metal catalyzed phenolic resin from substantially darkening notwithstanding normal heating or aging. Preferably ammonium based-salt comprises up to 40 weight percent of the total alkali metal hydroxide catalyzed phenolic resin. More preferably ammonium-based salt comprises up to 10 weight percent. Even more preferably the amount of salt present is such that the mole ratio of ammonium cations of the ammonium-based salt to hydroxy anions of the catalyst of the resin ranges from about 0.5:1 to about 10:1. And most preferably the ratio ranges from about 0.5:1 to about 2:1.

The color stabilized phenolic resins of the present invention are useful in any application where such resins are used, more particularily where color stabilization of the resin is desired. The invention provides abrasive products comprised of the color stabilized alkali metal hydroxide catalyzed resin, such products include, for example, coated and three-dimensional, low density (also known as "nonwoven") abrasive products, as well as components thereof including, for example, agglomerates.

Ammonium aluminum fluoride-based salts useful in the present invention are disclosed in assignee's copending patent application, U.S. Ser. No. 07/479,116, filed Feb. 13, 1990, now U.S. Pat. No. 5,110,321.

DETAILED DESCRIPTION OF PREFERRED EMBODIMENTS

Alkali metal hydroxide catalyzed phenolic resins which are useful in the practice of the present invention are well known resins which are commercially available, for example, under the commercial designations AEROFENE ™ 721-55 (Ashland Chemical Co.), PLYOPHEN ™ CR3597 (Occidental Chemical Corp.), PLYOPHEN ™ CR3575, and BAKELITE ™ SW382 (Union Carbide).

The typical phenolic resins of the present invention result from the alkali metal hydroxide catalyzed reaction of phenol and formaldehyde in a mole ratio phenol to formaldehyde of about 1:1 to about 1:3 moles and a mole ratio of phenol to alkali metal hydroxide of about 1:1 to about 100:1. (See Knop and Scheib at pp. 64–65.)

The color of such base catalyzed phenolic resin is stabilized by the addition of one or more ammonium-based salts. The preferred ammonium-based salts include ammonium chloride, ammonium bifluoride, dibasic ammonium citrate, tribasic ammonium citrate, ammonium aluminum tetrafluoride, ammonium dihydrogen phosphate, diammonium hydrogen phosphate, and an ammonium aluminum fluoride-based salt represented by the general formula $(NH_4,M,M')AlF_6$, wherein M and M' are defined above. Preferably, the ammonium aluminum fluoride-based salt is $(NH_4)_3AlF_6$. Ammonium carbonate, however, does not provide a color stabilized alkali metal hydroxide catalyzed phenolic resin. It is believed that the oxidation of the phenol groups is not prevented because the alkali metal salt (i.e. alkali metal carbonate) either does not form or decomposes. In either case, it is believed that the carbonate is volatilized as carbon dioxide.

Most of these ammonium-based salts are commercially available For example, $(NH_4)_3AlF_6$ and ammonium boron tetrafluoride may be obtained from Pennwalt Chemical Corp.

Ammonium aluminum fluoride-based salts such as, for example, ammonium aluminum tetrafluoride, $K_2(NH_4)AlF_6$, and $Li(NH_4)_2AlF_6$ may be made by one skilled in the art. For example, ammonium aluminum tetrafluoride may be prepared by refluxing ammonium aluminum hexafluoride, synthetic boehmite, and water at about 100° C., cooling the material to about 25° C., filter-washing the reaction products with water, and then drying the residue. $K_2(NH_4)AlF_6$ may be prepared by heating ammonium aluminum hexafluoride, potassium hydroxide, and water at about 80° C., cooling the material to about 25° C., filter-washing the material with water, and drying the residue. $Li(NH_4)_2AlF_6$ may be prepared in the same manner as $K_2(NH_4)AlF_6$ except lithium hydroxide is used in place of potassium hydroxide and the material is heated to about 90° C. rather than 80° C.

The resin system of the present invention may be cured in the same manner as conventional alkali metal hydroxide catalyzed phenolic resins. While not wanting to be bound by theory, it is believed that during curing (or aging) the presence of ammonium-based salt in alkali metal hydroxide catalyzed phenolic resin interferes with the formation of the intensely red phenoquinone by converting the alkali metal hydroxide in the resin to ammonium hydroxide and an alkali metal salt, thereby preventing oxidation of the phenol groups of the resin.

The resins of the present invention may include conventional additives in conventional amounts known in the art to be useful with base catalyzed phenolic resins. For example, colorants may be incorporated into the resin system to identify the manufacturer, type of product, application or for some other reason. Such colorants, include, for example, dyes and pigments. The present invention provides an alkali metal catalyzed phenolic resin system wherein the effect of a colorant is not substantially impaired by a darkening of the resin notwithstanding normal heating or aging.

Other additives useful in abrasive articles may include, for example, coupling agents, wetting agents, surfactants, plasticizers, inorganic fillers including active fillers known as grinding aids, the like, and combinations thereof.

Additives may affect the viscosity of the liquid resin system. Conventional techniques may be used to adjust the viscosity including, for example, the addition of solvents (e.g. ethylene glycol monoethyl ester, propylene glycol monomethyl ether, water, and the like).

As previously mentioned, the present invention provides improved abrasive products which are improved by the inclusion of the color stabilized alkali metal hydroxide catalyzed phenolic resin. The improved abrasive products include coated and three-dimensional, low density abrasive products and components of such products such including, for example, agglomerates.

Coated abrasive products are characterized by having a support member having a front surface and a back surface, abrasive granules, a first layer of a bond system which serves to bond said abrasive granules to said support member (e.g. a make layer or slurry layer), optionally at least one size layer overlying the first layer, and optionally at least one supersize layer overlying the size layer. Optionally, the support member may contain a saturant or have a backsize layer (on the back surface of the support member). Additional abrasive granules may be embedded in at least one of the size or supersize layers.

At least one of the saturant, backsize and layers of the coated abrasive article of the present invention comprises the color stabilized alkali metal hydroxide catalyzed phenolic. The remaining layers, saturant, and backsize may comprise conventional components such as alkali metal hydroxide catalyzed phenolic resin without the color stabilizer of the present invention, hide glue, acid catalyzed phenolic resin, urea-formaldehyde resin, aminoplast resin (U.S. Pat. No. 4,903,440 (Larson et al.), melamine-formaldehyde resin and the like. These bonding systems may also include additives known in the art.

The remaining components of the coated abrasive product are conventional and can be selected from those typically used in this art. The support member, for example, may be formed of paper, cloth, vulcanized fibre, film, or any other backing material known for this use.

The abrasive granules may be any conventional grade (size) or material (composition) utilized in the formation of abrasive products. Such abrasive granules may include, for example, flint, garnet, fused aluminum oxide, co-fused alumina-zirconia, silicon carbide, diamond, silicon nitride coated silicon carbide, cubic boron nitride, sintered alpha-alumina-based ceramic and combinations thereof.

Sintered alpha-alumina-based ceramic abrasive granules are described, for example, by Leitheiser et al. in U.S. Pat. No. 4,314,827 and by Monroe et al. in U.S. Pat. Nos. 4,770,671 and 4,881,951. The alpha-alumina-based ceramic abrasive may also be seeded (with or without modifiers) with a nucleating material such as iron oxide or alpha-alumina particles as disclosed by Schwabel, U.S. Pat. No. 4,744,802. The term "alpha-alumina-based ceramic abrasive granules" as herein used is intended to include unmodified, modified, seeded and unmodified, and seeded and modified ceramic granules.

The frequency of the abrasive granules on the backing is conventional. The abrasive granules, agglomerates, or other, can be orientated or can be applied to the backing without orientation, depending on the requirements of the particular coated abrasive product.

It is also within the scope of this invention to use the resin system of the present invention as a treatment for the fabric backing materials of the coated abrasive product.

The coated abrasive product of the invention may also include such modifications as are known in this art. For example, a back coating such as a pressure-sensitive adhesive may be applied to the nonabrasive side of the backing and various supersizes may be applied to the abrasive surface, such as zinc stearate to prevent abrasive loading.

The three-dimensional, low density abrasive products is characterized by having a three-dimensional, low density web structure, abrasive granules, and the color stabilized alkali metal hydroxide catalyzed phenolic resin, which serves to bond the abrasive granules to the web structure. Such products typically having a void volume within the range of from about 85% to 95% and can be prepared by techniques known in the art, including, for example, as described by Hoover et al. in U.S. Pat. No. 2,958,593. Abrasive granules useful in three-dimensional, low density abrasive products include those useful in preparing coated abrasive products and may also include calcium carbonate, silica, and pumice.

It is within the scope of this invention to convert the three-dimensional, low density abrasive, which usually is made in the form of mats, to other useful forms including, for example, flap wheels, spiral wheels, and pads.

EXAMPLES

Objects and advantages of this invention are further illustrated by the following examples, but the particular materials and amounts thereof recited in these examples, as well as other conditions and details, should not be construed to unduly limit this invention. All parts and percentages given in the examples are by weight unless otherwise indicated. It should be noted that the compositions of the examples are summarized in Tables I, II, and III. The colors indicated demonstrate the trend observed by mixing an ammonium-based salt into an alkali metal hydroxide catalyzed phenolic resin.

EXAMPLES 1–4

Ammonium aluminum hexafluoride and 15 grams of PLYOPHEN CR3597 phenolic resin were mixed together in a 50 ml beaker by hand with a wooden stick. About one gram of the resin/ammonium aluminum hexafluoride blend was spread onto a glass slide over a 2 to 6 cm$^2$ area and cured in an oven at about 120° C. for about 5 hours. A control was prepared in the same manner as Examples 1–4 except it did not contain ammonium aluminum hexafluoride.

The color of the cured resin shifted from red-purple (Control) to yellow (Examples 3 and 4) as the amount of ammonium aluminum hexafluoride added to the resin was increased.

TABLE I

| Example | Ammonium-based salt | Grams of ammonium-based salt added to 15 grams of PLYOPHEN CR3597 phenolic resin | Uncured color | Cured color |
| --- | --- | --- | --- | --- |
| Control | — | — | clear | red-purple |
| 1 | (NH$_4$)$_3$AlF$_6$ | 0.24 | bright yellow | red-brown |
| 2 | (NH$_4$)$_3$AlF$_6$ | 0.40 | bright yellow | light yellow-red |
| 3 | (NH$_4$)$_3$AlF$_6$ | 0.55 | bright yellow | yellow |
| 4 | (NH$_4$)$_3$AlF$_6$ | 0.79 | bright yellow | yellow |

EXAMPLES 5–8

Examples 5–8 were prepared in a manner similar to Example 3 except the ammonium-based salts listed in Table II were used rather than ammonium aluminum hexafluoride. The examples were cured according to the following heating schedule:

| Temperature, °C. | Time at temperature, |
| --- | --- |
| 66 | 10 minutes |
| 77 | 30 minutes |
| 93 | 20 minutes |
| 100 | 20 minutes |
| 121 | 3 hours, 45 minutes |

NH$_4$Cl (Example 5), NH$_4$H$_2$PO$_4$ (Example 6), and (NH$_4$)$_2$HPO$_4$ (Example 7) provided a resin which did not substantially darken when cured.

(NH$_4$)$_2$CO$_3$, which foamed when added to the resin, however, did not prevent the resin from darkening when cured. It is believed that ammonium carbonate-based salts fail to color stabilize the resin because such salts decompose and volatilize when subjected to the temperature required to cure the resin.

TABLE II

| Example | Ammonium-based salt | Grams of ammonium-based salt added to 15 grams of PLYOPHEN CR3597 phenolic resin* | Uncured color | Cured color |
| --- | --- | --- | --- | --- |
| Control-A | — | — | clear | red |
| Control-B | (NH$_4$)$_3$AlF$_6$ | 0.55 | bright yellow | yellow |
| 5 | NH$_4$Cl | 0.46 | light yellow | yellow |
| 6 | NH$_4$H$_2$PO$_4$ | 0.98 | clear | yellow |
| 7 | (NH$_4$)$_2$HPO$_4$ | 0.56 | yellow | yellow-brown |
| 8 | (NH$_4$)$_2$CO$_3$ | 0.41 | yellow | brown |

*The quantity of each ammonium-based salt provided the same number of moles of NH$_4^+$ ions.

EXAMPLES 9 AND 10

Examples 9 and 10 were prepared in a manner similar to Example 1 except dibasic ammonium citrate and ammonium bifluoride were added to the resin in the amounts listed in Table III and were cured according to the following heating schedule:

| Temperature, °C. | Time at temperature |
| --- | --- |
| 71 | 30 minutes |
| 93 | 2 hours |
| 121 | 4 hours, 30 minutes |

Dibasic ammonium citrate (Example 9) and ammonium bifluoride (Example 10) each provided a resin which did not substantially darken when cured.

TABLE III

| Example | Ammonium-based salt | Grams of ammonium-based salt added to 15 grams of PLYOPHEN CR3597 phenolic resin* | Uncured color | Cured color |
| --- | --- | --- | --- | --- |
| Control-A | — | — | clear | red |
| 9 | (NH$_4$)$_2$HC$_6$H$_5$O$_7$ | 0.97 | yellow | yellow |

TABLE III-continued

| Example | Ammonium-based salt | Grams of ammonium-based salt added to 15 grams of PLYOPHEN CR3597 phenolic resin* | Uncured color | Cured color |
|---|---|---|---|---|
| 10 | (NH$_4$)HF$_2$ | 0.49 | yellow | yellow |

*The quantity of each ammonium-based salt provided the same number of moles of NH$_4^+$ ions.

EXAMPLE 11

Example 11 was prepared in a manner similar to Control-B except a green dye was added to the resin/salt blend. The dyed resin with ammonium aluminum hexafluoride, Example 11, provided a light green cured resin whereas the control turned a very dark green when cured.

EXAMPLE 12

Example 12 was prepared in a manner similar to Control-B except a green pigment was added to the resin/salt blend. The pigmented resin with ammonium aluminum hexafluoride, Example 12, provided a light green cured resin whereas the control turned black when cured.

TABLE IV

| Example | Colorant | Grams of colorant added to 15 grams of PLYOPHEN CR3595 phenolic resin | Grams of ammonium aluminum fluoride added to 15 grams of PLYOPHEN CR3595 phenolic resin and 0.12 grams of colorant | Uncured color | Cured color |
|---|---|---|---|---|---|
| Control-D | Green Dye$^a$ | 0.12 | 0.0 | dark green | darker green |
| 11 | Green Dye$^a$ | 0.12 | 0.55 | dark green | light green |
| Control-E | Green Pigment$^b$ | 0.12 | 0.0 | dark green | black |
| 12 | Green Pigment$^b$ | 0.12 | 0.55 | dark green | light green |

$^a$Reactive Green X8218LV, Milliken Chemical Co.
$^b$Monolite Green 751 Pigment, ICI America, Inc.

Various modifications and alterations of this invention will become apparent to those skilled in the art without departing from the scope and spirit of this invention, and it should be understood that this invention is not to be unduly limited to the illustrative embodiments set forth herein.

We claim:
1. A coated abrasive article comprising
   (a) a support member having a front surface and a back surface, said support member optionally being saturated with a saturant, and said back surface of said support member optionally having a backsize layer;
   (b) abrasive granules;
   (c) a first layer of a bond system which serves to bond said abrasive granules to front surface of said support member;
   (d) optionally at least one size layer overlying said first layer; and
   (e) optionally at least one supersize layer overlying said size layer;
wherein at least one of said saturant, said backsize layer, said first layer, said size layer, and said supersize layer comprises
   (a) a cured alkali metal hydroxide catalyzed phenolic resin; and
   (b) reaction residue with said alkali metal hydroxide catalyzed phenolic resin of an amount of at least one ammonium-based salt sufficient to color stabilize said cured resin, with the proviso that said ammonium-based salt is essentially free of ammonium boron tetrafluoride.

2. The coated abrasive article according to claim 1 wherein said ammonium-based salt is NH$_4$AlF$_4$.

3. The coated abrasive article according to claim 1 wherein said ammonium based salt is represented by the general formula $$(NH_4,M,M')AlF_6,$$

wherein M and M' are cations which may be the same or different and are selected from the group consisting of NH$_4^+$, Li$^+$, Na$^+$, and K$^+$.

4. The coated abrasive article according to claim 1 wherein said ammonium-based salt is selected from the group consisting of ammonium chloride, ammonium bifluoride, dibasic ammonium citrate, tribasic ammonium citrate, ammonium dihydrogen phosphate, and diammonium hydrogen phosphate.

5. The coated abrasive article according to claim 1 wherein said cured alkali metal hydroxide catalyzed phenolic resin contains a colorant.

6. The coated abrasive article according to claim 1 wherein said abrasive granules are comprised of a material selected from the group consisting of fused alumina, co-fused alumina-zirconia, silicon carbide, flint, garnet, diamond, silicon nitride coated silicon carbide, cubic boron nitride, sintered alpha-alumina-based ceramic and combinations thereof.

7. A coated abrasive article comprising
   (a) a support member having a front surface and a back surface, said support member optionally being saturated with a saturant, and said back surface of said support member optionally having a backsize layer;
   (b) abrasive granules;
   (c) a first layer of a bond system which serves to bond said abrasive granules to said front surface of said support member;
   (d) optionally at least one size layer overlying said first layer; and
   (e) optionally at least one supersize layer overlying said size layer;
wherein at least one of said saturant, said backsize layer, said first layer, said size layer, and said supersize layer comprises
   (a) a cured alkali metal hydroxide catalyzed phenolic resin; and
   (b) reaction residue with said alkali metal hydroxide catalyzed phenolic resin of an amount of at least one ammonium-based salt sufficient to color stabilize said cured resin, wherein said salt is selected from the group consisting of:

(i) an ammonium-based salt having the formula $NH_4AlF_4$;

(ii) ammonium-based salts represented by the general formula $(NH_4, M, M')AlF_6$, wherein M and M' are cations which may be the same or different and are selected from the group consisting of $NH_4^+$, $Li^+$, $Na^+$, and $K^+$; and (iii) ammonium-based salts selected from the group consisting of ammonium chloride, ammonium bifluoride, dibasic ammonium citrate, tribasic ammonium citrate, ammonium dihydrogen phosphate, and diammonium hydrogen phosphate.

8. The coated abrasive article according to claim 7 wherein said alkali metal hydroxide catalyzed phenolic resin contains a colorant.

9. The coated abrasive article according to claim 7 wherein said abrasive granules are composed of a material selected from the group consisting of fused alumina, co-fused alumina-zirconia, silicon carbide, flint, garnet, diamond, silicon nitride coated silicon carbide, cubic boron nitride, sintered alpha-alumina-based ceramic and combinations thereof.

10. A three-dimensional, low density abrasive article comprising (a) a three-dimensional, low density web structure;
(b) abrasive granules; and
(c) a bond system which serves to bond said abrasive granules to said web structure, wherein said bond system comprises (a) a cured alkali metal hydroxide catalyzed phenolic resin; and
(b) reaction residue with said alkali metal hydroxide catalyzed phenolic resin of an amount of at least one ammonium-based salt sufficient to color stabilize said cured resin, with the proviso that said ammonium-based salt is essentially free of ammonium boron tetrafluoride.

11. The three-dimensional, low density abrasive article according to claim 10 wherein said ammonium-based salt is $NH_4AlF_4$.

12. The three-dimensional, low density abrasive article according to claim 10 wherein said ammonium-based salt is represented by the general formula $(NH_4,M,M')AlF_6$, wherein M and M' are cations which may be the same or different and are selected from the group consisting of $NH_4^+$, $Li^+$, $Na^+$, and $K^+$.

13. The three-dimensional, low density abrasive article according to claim 10 wherein said ammonium-based salt is selected from the group consisting of ammonium chloride, ammonium bifluoride, dibasic ammonium citrate, tribasic ammonium citrate, ammonium dihydrogen phosphate, and diammonium hydrogen.

14. The three-dimensional, low density abrasive article according to claim 10 wherein said cured alkali metal hydroxide catalyzed phenolic resin contains a colorant.

15. The three-dimensional, low density abrasive article according to claim 10 wherein said abrasive granules are comprised of a material selected from the group consisting of fused alumina, co-fused alumina-zirconia, silicon carbide, flint, garnet, diamond, silicon nitride coated silicon carbide, cubic boron nitride, sintered alpha-alumina-based ceramic, calcium carbonate, silica, pumice, and combinations thereof.

16. A three-dimensional, low density abrasive article comprising (a) a three-dimensional, low density web structure;
(b) abrasive granules; and
(c) a bond system which serves to bond said abrasive granules to said web structure, wherein said bond system comprises (a) a cured alkali metal hydroxide catalyzed phenolic resin; and
(b) reaction residue with said alkali metal hydroxide catalyzed phenolic resin of an amount of at least one ammonium-based salt sufficient to color stabilize said cured resin, wherein said salt is selected from the group consisting of:

(i) an ammonium-based salt having the formula $NH_4AlF_4$;

(ii) ammonium-based salts represented by the general formula $(NH_4,M,M')AlF_6$, wherein M and M' are cations which may be the same or different and are selected from the group consisting of $NH_4^+$, $Li^+$, $Na^+$, and $K^+$; and (iii) ammonium-based salts selected from the group consisting of ammonium chloride, ammonium bifluoride, dibasic ammonium citrate, tribasic ammonium citrate, ammonium dihydrogen phosphate, and diammonium hydrogen phosphate.

17. The three-dimensional, low density article according to claim 16 wherein said alkali metal hydroxide catalyzed phenolic resin contains a colorant.

18. The three-dimensional, low density article according to claim 16 wherein said abrasive granules are comprised of a material selected from the group consisting of fused alumina, co-fused alumina-zirconia, silicon carbide, flint, garnet, diamond, silicon nitride coated silicon carbide, sintered alpha-alumina-based ceramic, calcium carbonate, silica, pumice, and combinations thereof.

* * * * *